United States Patent Office 2,952,707
Patented Sept. 13, 1960

2,952,707

GERMICIDAL POLYAMINO ETHER ALCOHOLS

Edward Joseph Nikawitz, Glen Rock, N.J., assignor to The Givaudan Corporation, New York, N.Y., a corporation of New Jersey No Drawing. Filed Jan. 31, 1955, Ser. No. 485,310

13 Claims. (Cl. 260—584)

This invention relates to novel chemical products, and more especially to novel polyamino ether alcohols characterized in particular by their germicidal activity.

My novel substances may be represented by the following general formula:

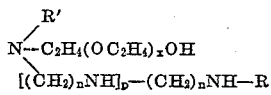

wherein

R'=H, $(CH_2)_n$—NH—R or alkyl from $C_8$ to $C_{16}$,
R=alkyl groups containing from 8 to 24 carbon atoms,
n=2–4,
p=0–6, and
x=1–20; and the salts of these bases.

It is understood that the sum of the total number of carbon atoms in the alkyl groups should not exceed 24.

It is also understood that mono- and poly-acid salts are included herein, as well as acid salts made by neutralizing less than all of the replaceable hydrogens in polybasic acids.

Salts of inorganic acids in general and salts of organic acids having not more than 8 carbon atoms in the molecule are also included in my present invention.

Examples of some of the novel products of this invention include:

1 - N - lauryl - 5 - N - polyetheralcohol - trimethylenediamine which may be represented by the formula

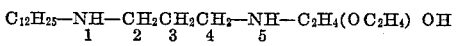

1 - N - lauryl - 5 - N - polyetheralcohol - trimethylenediamine monohydrochloride
1 - N - lauryl - 5 - N - polyetheralcohol - trimethylenediamine monosulfate
1 - N - lauryl - 5 - N - polyetheralcohol - trimethylenediamine monoethanesulfonate
1 - N - lauryl - 5 - N - polyetheralcohol - trimethylenediamine monoacetate
1 - N - lauryl - 5 - N - polyetheralcohol - trimethylenediamine citrate
1 - N - lauryl - 5 - N - polyetheralcohol - trimethylenediamine succinate
1 - N - lauryl - 5 - N - polyetheralcohol - trimethylenediamine 2,4,5-trichlorophenolate
1 - N - mixed alkyl - 5 - N - polyetheralcohol - trimethylenediamine monohydrochloride
1 - N - octadecyl - 5 - N - polyetheralcohol - trimethylenediamine monohydrochloride
1 - N,7 - N - dioctyl - 4 - N - polyetheralcohol - diethylenetriamine monohydrochloride
1 - N,7 - N - dioctyl - 7 - N - polyetheralcohol - diethylenetriamine monohydrochloride
1 - N - lauryl - 7 - N - polyetheralcohol - diethylenetriamine monohydrochloride
1 - N - lauryl - 13 - N - polyetheralcohol - tetraethylenepentamine monohydrochloride In general, the novel compounds of this invention are prepared as follows:

The monohydrohalides are prepared by heating the corresponding polyamines of the following general formula:

with polyalkyleneglycol halides of the following general formula:

wherein Y represents chlorine or bromine, for a period from about 5 minutes at reaction temperatures of about 200° C. to a few hours at temperatures of about 140° C.

The free bases are prepared by reacting the hydrohalides with an equivalent amount of alkaline substance. Examples of such alkaline materials are alkali metal hydroxides, such as sodium hydroxide, alkali metal alcoholates such as sodium methylate and alkali metal carbonates, such as sodium carbonate.

Salts with inorganic acids, suitable organic acids and acid-reacting substances such as phenols, are prepared from the free bases by the addition of appropriate equivalent amounts of acidic substances, the amount being determined by the number of basic nitrogen groups to be neutralized.

Mixed salts can be prepared from the free bases or from the "unmixed" salts, i.e., salts with one acid residue. When free bases are employed suitable equivalent amounts of 2 or more acids are added to the base, in the presence or absence of alcohol or water. The addition of the acids can take place simultaneously or the acids may be added one at a time, i.e., an "unmixed" salt is first prepared as above with acid No. 1, then acid No. 2 is added thereto to form the mixed salt of acids No. 1 and No. 2, etc. It will of course be understood that the number of acid residues which may be contained in the mixed salts is limited by the number of amino N atoms in the compound.

The novel products of this invention are viscous to gelatinous, brownish in appearance, possess amine-like odor, and are soluble or dispersible in water, dilute alkalies and acids. Their solutions are surface-active and foam.

In addition to the aforementioned germicidal activity, the novel products of this invention possess other desirable properties. In this connection mention is made of their use as surfactants and chemical intermediates.

The germicidal activity of these compounds was determined by using the standard F.D.A. phenol coefficient test procedure (U.S. Dept. of Agriculture, Circular 198, December 1931) with the Cade-Halvorson plate count modification (Soap, 10, 17, August 1934; 25, September 1934) to obtain the "counts," or number of bacteria surviving. *Micrococcus pyogenes* var. *aureus* and *Salmonella typhosa* were the test organisms used, representing the gram-positive and gram-negative types of bacteria, respectively. The test temperature and contact time were 37° C. and 5 min. A minus (—) sign means "no growth" in the subculture tubes, while the numerical figures represent the number of colonies of bacteria formed by the viable organisms which were carried over to the plates from the medication tubes at the end of the test period. A difference of 50 can be considered as the limits of significant figures. Counts of more than 5,000 are estimated, as the plates showed too many colonies to be counted accurately.

Data (averages from several duplicate sets of tests) using the procedures as just described are presented in Table I.

TABLE I.—GERMICIDAL ACTIVITY

| Compound | 1-10,000 in water | | 1-20,000 in water | |
|---|---|---|---|---|
| | M. aureus | S. typhosa | M. aureus | S. typhosa |
| 1-N,7-N-Dioctyl-N-polyetheralcohol*-diethyl-enetriamine monohydrochloride | −0 | −0 | +15 | +30 |
| 1-N-Lauryl-5-N-polyetheralcohol*-trimethyl-enediamine monohydrochloride | −0 | −0 | +20 | +30 |
| 1-N-Lauryl-7-N-polyetheralcohol*-diethylene-triamine monohydrochloride | −0 | −0 | +10 | −0 |
| 1-N-(Mixed alkyl**)-5-N-polyetheralcohol* trimethylene-diamine-monohydrochloride | +0 | −0 | +35 | +3 |
| Ethomeen C/15 (Armour) R***—N(CH$_2$CH$_2$O)$_5$H (CH$_2$CH$_2$O)$_5$H | +750 | .......... | +3,500 | +7,000 |
| Priminox 32 t-C$_{18-24}$H$_{37-49}$NH(CH$_2$CH$_2$O)$_{25}$H (Rohm & Haas) | +9,000 | .......... | +10,000 | +10,000 |

*Molecular weight of polyetheralcohol chain=375 approximately.
**Mixed alkyl=hydrocarbonrest contained in tallow.
***R=hydrocarbonrest contained in coconut oil.

In order to clarify this invention further the following examples are given, it being intended that these examples are for purposes of illustration and not for purpose of limitation.

*Example 1*

1-N-OCTADECYL-5-N-POLYETHERALCOHOL-TRI-METHYLENEDIAMINE MONOHYDROCHLORIDE 32.6 grams of 1-N-octadecyl-trimethylenediamine (obtained by fractional distillation of Duomeen T of Armour and Co. B.P. at a pressure of 5 mm. of mercury: 215–225° C. Analysis for M.W. 326: percent C calculated: 77.3; found: 77.3. Percent H calculated: 14.1; found: 13.9) and 61 grams of polyethyleneglycol chloride (Carbide and Carbon Chemicals Company) with a molecular weight of 610 approximately were placed in a 250 ml. three-neck flask fitted with a sealed stirrer, a thermometer and a reflux condenser. The contents of the flask were agitated and heated rapidly to 190° to 200° C. and maintained thereat for 5 minutes.

After cooling, a brown product, gelatinous in appearance and with slight amine odor resulted. Yield: 93.6 g. It is soluble in water, dilute acids such as 0.1% hydrochloric and 0.1% sulfuric acids, and dilute alkalies such as 0.1% sodium hydroxide. On analysis, the product was found to contain 3.8 percent of ionized chlorine, which is the theoretical amount for 1-N-octadecyl-5-N-polyetheralcohol-trimethylenediamine monohydrochloride with a M.W. of 936.

The germicidal activity of the product of this example is the same as that of 1-N-mixed alkyl-5-N-polyetheralcohol trimethylenediamine monohydrochloride (Table I) when tested in accordance with the F.D.A. procedure referred to above.

*Example 2*

1-N-LAURYL-5-N-POLYETHERALCOHOL TRIMETHYL-ENEDIAMINE MONOHYDROCHLORIDE 12.1 grams of 1-N-lauryl-trimethylenediamine (obtained by fractional distillation of Duomeen 12 of Armour and Co. B.P. at 6 mm. of mercury: 166–176° C. Analysis for M.W. 242: percent C. calculated: 74.4; found: 74.3. Percent H calculated: 14.0; found: 13.8) and 6.2 grams of polyethyleneglycol chloride having a molecular weight of 124 approximately were agitated and heated for 2 hours at 140° C. in a 125 ml. flask fitted with a sealed stirrer, a thermometer and a reflux condenser. Yield: 17.7 g.

| Analysis for M.W. 366 | Calculated | Found |
|---|---|---|
| Percent Cl ionized | 9.7 | 9.2 |

The gelatinous brownish substance is dispersible in dilute alkalies, such as 0.1% sodium hydroxide and soluble in water and dilute acids, such as 0.1% hydrochloric acid and 0.1% sulfuric acid.

In similar manner, 12.1 gram amounts of 1-N-lauryl-trimethylenediamine were reacted separately with (a) 10.5 grams of polyethyleneglycol chloride of approximate molecular weight 210, (b) 21 grams of polyethyleneglycol chloride of approximate molecular weight 410 and (c) 31 grams of polyethyleneglycol chloride of approximate molecular weight 610, respectively.

All of the products (a–c), prepared in accordance with above example in 96–97% yields, are gelatinous, slightly brownish in color, and have a weak amine odor. They are all soluble in water, dilute acids, such as 0.1% hydrochloric and 0.1% sulfuric acids, and dilute alkalies, such as 0.1% sodium hydroxide.

When tested in accordance with the above-noted F.D.A. procedure the germicidal activity of all of the products made in accordance with the present example is substantially the same, the specific data on 1-N-lauryl-5-N-polyetheralcohol trimethylenediamine monohydrochloride with the average molecular weight of the polyetheralcohol radical of 375 being given in Table I.

*Example 3*

1-N-MIXED ALKYL-5-N-POLYETHERALCOHOL TRI-METHYLENEDIAMINE MONOHYDROCHLORIDE (a) 30.3 grams of 1-N-mixed alkyl-trimethylenediamine (Duomeen 12, Armour) and 12.4 grams of polyethyleneglycol chloride (approximate molecular weight 124) were charged into a 250 ml. flask fitted with a sealed stirrer, a thermometer and a reflux condenser. The contents of the flask were stirred and heated for 2 hours at 140° C.

After cooling to room temperature, the resulting product (42.6 g.) is gelatinous and brownish in appearance and is soluble in water and dilute acids, such as 0.1% hydrochloric acid. Its solution in dilute alkalies, such as 0.1% sodium hydroxide, is turbid. Its germicidal activity is the same as that listed in Table I for 1-N-mixed alkyl-5-N-polyetheralcohol trimethylenediamine monohydrochloride.

| Analysis for M.W. 427 | Calculated | Found |
|---|---|---|
| Percent Cl ionized | 8.3 | 8.1 |

In similar manner and with the same results as noted in (a) various Duomeens were brought to reaction with polyethyleneglycol chlorides in ratios as shown in Table II. Nearly quantitative yields of the desired products were obtained.

All members of this series described in Table II are soluble in water and dilute acids, such as 0.1% hydrochloric acid. Compounds prepared from polyethyleneglycol chloride 110 or 210 form turbid solutions with dilute alkalies such as 0.1% sodium hydroxide. The solution of compounds prepared from polyethyleneglycol chloride 410 or 610 in dilute alkalies such as 0.1% sodium hydroxide is clear.

TABLE II

| Duomeens (1-N-mixed alkyl-trimethylenediamines) | Polyethyleneglycol chlorides of approximate molecular weight | | | |
|---|---|---|---|---|
| | 124 | 210 | 410 | 610 |
| | g. | g. | g. | g. |
| Duomeen 12: 30.3 g | | 21 | 41 | 61 |
| Duomeen C: 32.1 g | 12.4 | 21 | 41 | 61 |
| Duomeen S: 40.2 g | 12.4 | 21 | 41 | 61 |
| Duomeen T: 40.0 g | 12.4 | 21 | 41 | 61 |

Duomeen is the generic trade name adopted by the Armour Chemical Division to designate technical fatty diamines of this general formula: 1-N-alkyl-trimethylenediamine

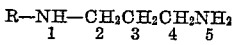

The "R" represents alkyl groups derived from fatty acids, identification of which is as follows:

Duomeen 12—lauric
Duomeen C—coconut
Duomeen S—soya
Duomeen T—tallow

*Example 4*

1-N,7-N-DIOCTYL - N - POLYETHERALCOHOL - DIETHYLENETRIAMINE MONOHYDROCHLORIDES IN WHICH THE POLYETHER ALCOHOL GROUP IS ATTACHED TO 4-N OR 7-N 55 g. of octyl chloride were dropped into 58 g. of refluxing and agitated diethylenetriamine during 4 hours. After standing for about 12 hours at room temperature the supernatant liquid was decanted from the solid cake of diethylenetriamine hydrochloride and distilled twice at a pressure of 4 mm. of mercury. 11.7 g. of pure, oily 1 - N,7 - N - dioctyl-diethylenetriamine with a B.P. of 210–220° C. were isolated. Analysis: Percent C calculated: 73.4; found 73.3. Percent H calculated: 13.7; found 13.7; $n_D^{20}=1.4666$.

6.6 g. of the above 1-N, 7-N-dioctyl-diethylenetriamine and 8.4 g. of polyethyleneglycol chloride with an approximate molecular weight of 410 were agitated and heated for 2 hours at 140° C. in a 125 ml. flask fitted with a sealed stirrer, a thermometer and a reflux condenser. 1-N-7-N-dioctyl - N - polyetheralcohol-diethylenetriamine monohydrochloride, a brownish viscous product, was obtained in a yield of 14.8 g. It forms turbid solutions with water, dilute acids, such as 0.1% hydrochloric acid and dilute alkalies, such as 0.1% sodium hydroxide.

*Example 5*

1-N-LAURYL-7-N-POLYETHERALCOHOL-DIETHYLENETRIAMINE MONOHYDROCHLORIDE 51 g. of lauryl chloride were dropped during 3 hours into 103 g. of agitated diethylenetriamine at 100–110° C. Heating at this temperature was continued for 3 hours. After cooling to room temperature, 10 g. of sodium hydroxide dissolved in 20 ml. of water and 100 ml. of ethyl alcohol were added, the precipitated sodium chloride was filtered off and the dilute alcohol removed from the filtrate by distillation, 32.2 g. of pure 1-N-lauryl-diethylenetriamine were isolated by distillation at a pressure of 4 mm. of mercury at 200–205° C. as a colorless oil. Analysis: Percent C calculated 70.8; found 70.7; percent H calculated 13.7; found 14.1; $n_D^{20}=1.4675$.

5.4 g. of the above 1-N-lauryl-diethylenetriamine and 8.2 g. of polyethyleneglycol chloride with an approximate molecular weight of 410 were agitated and heated for 2 hours at 140° C. in a 125 ml. flask fitted with a sealed stirrer, a thermometer and a reflux condenser.

The resulting product, 13.6 g. of 1-N-lauryl-7-N-polyetheralcohol-diethylenetriamine monohydrochloride, a brownish viscous substance, is clearly soluble in water, dilute acids, such as 0.1% hydrochloric acid and dilute alkalies, such as 0.1% sodium hydroxide.

*Example 6*

1-N-LAURYL-13-N-POLYETHERALCOHOL-TETRAETHYLENEPENTAMINE MONOHYDROCHLORIDE 50 g. of lauryl bromide were added during one hour to 152 g. of tetraethylenepentamine at 110–120° C. under stirring. After heating for 8 hours to 140° C., and subsequent cooling to room temperature, 8 g. of sodium hydroxide, 30 ml. of water and 200 ml. of alcohol were added. The aqueous alcohol was then removed by distillation at a pressure of 40 mm. of mercury. The precipitated sodium bromide was filtered off and the filtrate distilled at a pressure of 5 mm. of mercury at 235–275° C.; 42.1 g. of a yellow, water-soluble oil were obtained.

| Analysis | Calculated | Found |
|---|---|---|
| Percent C | 67.2 | 67.1 |
| Percent H | 13.1 | 12.9 |
| Percent N | 19.6 | 20.0 |

$n_D^{20}=1.4868$.

7.0 g. amounts of 1-N-lauryl-tetraethylenepentamine were agitated and heated with (a) 4.2 g. of polyethyleneglycol chloride (approximate M.W. 210) and (b) in another experiment with 8.2 g. of polyethyleneglycol chloride (approximate M.W. 410) for 2 hours at 140° C. The resulting brownish viscous products obtained in nearly quantitative yields are soluble in water, dilute acids, such as 0.1% hydrochloric acid and dilute alkalies, such as 0.1% sodium hydroxide and possess a germicidal activity substantially the same as that of the products of the previous examples.

*Example 7*

1-N-LAURYL-5-N-POLYETHERALCOHOL-TRIMETHYLENEDIAMINE 65.2 g. of the product made in accordance with Example 2(b), 200 ml. of absolute ethyl alcohol and 4 grams of sodium hydroxide, dissolved in 6 ml. of water, were stirred for 1 hour. The precipitated sodium chloride was filtered off and washed with 20 ml. of absolute alcohol. The filtrate was freed from the alcohol by distillation at a pressure of 30 mm. of mercury. The residue was triturated with 200 ml. of absolute ethyl ether. The additional salt which was precipitated was filtered off, washed with 20 ml. of absolute ethyl ether and combined with the first crop of sodium chloride. Yield of sodium chloride after drying: 5.5 g.

The filtrate was freed from the ethyl ether by distillation. The residue was dried at a pressure of 5 mm. of mercury for 30 minutes.

The resulting viscous oil (61.2 g.) contains a trace of sodium chloride. The product of this example is soluble in water, dilute acids, such as 0.1% hydrochloric and 0.1% sulfuric acids, and dilute alkalies, such as 0.1% sodium hydroxide. The germicidal activity of the product of this example is substantially the same as that of the aforementioned products of this invention.

Example 8
MONOACETATE OF 1-N-LAURYL-5-N-POLYETHER-ALCOHOL TRIMETHYLENEDIAMINE 6.2 grams of 1-N-lauryl-5-N-polyetheralcohol trimethylenediamine of Example 7 and 0.6 gram of acetic acid of 99% concentration dissolved in 10 ml. of ethyl alcohol were concentrated to dryness in an open dish on the steam bath and kept there for 6 hours.

The resulting monoacetate (6.8 g.) is a viscous brownish oil, soluble in water, and shows substantially the same germicidal activity as the other products of this invention.

Example 9
MONOSULFATE OF 1-N-LAURYL-5-N-POLYETHER-ALCOHOL TRIMETHYLENEDIAMINE 6.2 grams of the diamine prepared in accordance with Example 7 and 0.5 gram of sulfuric acid of 98 percent concentration dissolved in 10 grams of water were concentrated to dryness in an open dish on the steam bath and kept there for 6 hours.

The resulting monosulfate (6.7 g.) is a viscous, brownish oil, and it possesses substantially the same germicidal activity as that of the other products of this invention. Its solution in water is turbid.

Example 10
MONOETHANE SULFONATE OF 1-N-LAURYL-5-N-POLYETHERALCOHOL TRIMETHYLENEDIAMINE 6.2 grams of the diamine prepared in accordance with Example 7, 1.1 grams of ethane sulfonic acid dissolved in 10 grams of water were concentrated to dryness in an open dish on the steam bath and kept there for 6 hours.

The resulting monoethane sulfonate (7.3 g.) is a viscous brownish oil, soluble in water and it possesses substantially the same germicidal activity as that of the other products of this invention.

Example 11
1-N-LAURYL-5-N-POLYETHERALCOHOL-TRIMETHYLENEDIAMINE SUCCINATE 6.2 grams of 1-N-lauryl-5-N-polyetheralcohol-trimethylenediamine which was prepared according to the procedure of Example 7 and 1.2 grams of succinic acid (100%) dissolved in 10 ml. of ethyl alcohol were concentrated to dryness in an open dish on the steam bath and kept there for 6 hours. The resulting salt (7.3 g) is a brown, gelatinous substance, soluble in water. It possesses substantially the same germicidal activity as that of the aforementioned products of this invention.

Example 12
1-N-LAURYL-5-N-POLYETHERALCOHOL-TRIMETHYLENEDIAMINE CITRATE 6.2 grams of 1-N-lauryl-5-N-polyetheralcohol-trimethylenediamine which was prepared according to the procedure of Example 7 and 2.1 grams of the monohydrate of citric acid dissolved in 10 ml. of ethyl-alcohol were concentrated to dryness in an open dish on the steam bath and kept there for 6 hours. The resulting salt (8.0 g.) is a brown gelatinous substance, soluble in water. It possesses substantially the same germicidal activity as that of the aforementioned products of this invention.

Example 13
1-N-LAURYL-5-N-POLYETHERALCOHOL-TRIMETHYLENEDIAMINE 2,4,5-TRICHLOROPHENOLATE 6.2 grams of 1-N-lauryl-5-N-polyetheralcohol-trimethylenediamine which was prepared according to the procedure of Example 7 and 1.9 grams of 2,4,5-trichlorophenol dissolved in 10 ml. of ethyl alcohol were concentrated to dryness in an open dish on the steam bath and kept there for 6 hours. The resulting salt (8.0 g.) is a brown viscous substance, soluble in water. It possesses substantially the same germicidal activity as that of the aforementioned products of this invention.

Example 14
GERMICIDAL CLEANING COMPOSITION

A germicidal cleaner for cleansing and sterilizing milk bottles and similar containers for products intended for human consumption was prepared by dissolving 1 pound of any of the products of this invention in 100 to 1,000 pounds of water.

Example 15
DISINFECTING METAL CLEANER COMPOSITION

A disinfecting metal cleaner was prepared by dissolving 1 pound of any of the products of this invention in 100 to 1,000 pounds of water or a like amount of a 50% solution of water and isopropyl alcohol.

The terms "polyetheralcohol" and "polyethyleneoxyethanol" as used herein have identical meanings. The term "alkyl" designates radicals having the formula $C_nH_{2n+1}$.

The foregoing illustrates the invention, which however is not to be limited thereby but is to be construed as broadly as permissible in view of the prior art and limited solely by the appended claims.

I claim:
1. A member selected from the group consisting of (a) bases possessing germicidal activity and represented by the following general formula:

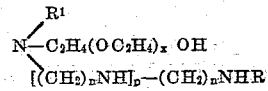

wherein $R^1$ is a member selected from the group consisting of H, $(CR_2)_nNHR$ and an alkyl group containing from 8 to 16 carbon atoms; R is an alkyl group containing from 8 to 24 carbon atoms; $n$ is 2 to 4, $p$ is an integer between 0 and 6; and $x$ is an integer such that the maximum average weight of the [2-(polyethyleneoxy)-ethanol] radical is 575; the sum of the total number of carbon atoms in the alkyl groups not exceeding 24; and (b) hydrohalides of said bases.

2. 1 - N - lauryl - 5 - N - [2-(polyethyleneoxy)ethanol]-trimethylenediamine mono-hydrochloride, wherein the average molecular weight of the [2-(polyethyleneoxy)-ethanol] radical is from 175 to 575.

3. 1 - N - lauryl - 5 - N - [2-(ethyleneoxy)-ethanol]-trimethylenediamine mono-hydrochloride.

4. 1 - N - lauryl - 5 - N-[2-(polyethyleneoxy)-ethanol]-trimethylenediamine, wherein the average molecular weight of the [2-(polyethyleneoxy)-ethanol] radical is from 175 to 575.

5. 1 - N - lauryl - 5-N-[2-(ethyleneoxy)-ethanol]-trimethylenediamine.

6. 1 - N - alkyl - 5-N-[2-(polyethyleneoxy)-ethanol]-trimethylenediamine mono-hydrochloride, wherein the average molecular weight of the [2-(polyethyleneoxy)-ethanol] radical is from 175 to 575 and the alkyl group contains from 8 to 24 carbon atoms.

7. 1 - N - alkyl - 5-N-[2-(ethyleneoxy)-ethanol]-trimethylenediamine mono-hydrochloride, wherein the alkyl group contains from 8 to 24 carbon atoms.

8. 1 - N,7 - N-dioctyl-N-[2-polyethyleneoxy)-ethanol]-diethylenetriamine mono-hydrochloride, wherein the average molecular weight of the [2-(polyethyleneoxy)-ethanol] radical is from 175 to 575.

9. 1 - N,7 - N - dioctyl-N-[2-(ethyleneoxy)-ethanol]-diethylenetriamine mono-hydrochloride.

10. 1 - N - lauryl - 7-N-[2-(polyethyleneoxy)-ethanol]-diethylenetriamine mono-hydrochloride, wherein the average molecular weight of the [2-(polyethyleneoxy)-ethanol] radical is from 175 to 575.

11. 1 - N - lauryl - 7-N-[2-(ethyleneoxy)-ethanol]-diethylenetriamine mono-hydrochloride.

12. 1 - N - lauryl-13-N-[2-(polyethyleneoxy)-ethanol]- tetraethylenepentamine mono-hydrochloride, wherein the average molecular weight of the [2-(polyethyleneoxy)-ethanol] radical is from 175 to 575.

13. 1 - N - lauryl-13-N-[2-(ethyleneoxy) - ethanol]-tetraethylenepentamine mono-hydrochloride.

References Cited in the file of this patent

UNITED STATES PATENTS

| | | |
|---|---|---|
| 2,214,352 | Schoeller et al. | Sept. 10, 1940 |
| 2,226,119 | De Groote et al. | Dec. 24, 1940 |
| 2,233,383 | De Groote et al. | Feb. 25, 1941 |
| 2,302,388 | Hester | Nov. 17, 1942 |
| 2,419,259 | Forman | Apr. 22, 1947 |
| 2,683,147 | Girod | July 6, 1954 |
| 2,717,909 | Kosmin | Sept. 13, 1955 |
| 2,790,003 | Bindler | Apr. 23, 1957 |

FOREIGN PATENTS

| | | |
|---|---|---|
| 667,744 | Germany | Nov. 19, 1938 |

UNITED STATES PATENT OFFICE

CERTIFICATE OF CORRECTION

Patent No. 2,952,707                  September 13, 1960

Edward Joseph Nikawitz

It is hereby certified that error appears in the printed specification of the above numbered patent requiring correction and that the said Letters Patent should read as corrected below.

Column 1, line 46, right-hand portion of the formula, for "$-C_2H_4(OC_2H_4)$ OH" read -- $-C_2H_4(OC_2H_4)_xOH$ --; column 8, line 35, for "$(CR_2)_nNHR$" read -- $(CH_2)_nNHR$ --.

Signed and sealed this 11th day of April 1961.

(SEAL)

Attest:
ERNEST W. SWIDER
Attesting Officer

ARTHUR W. CROCKER
Acting Commissioner of Patents